(12) United States Patent
Carroll et al.

(10) Patent No.: US 7,235,906 B2
(45) Date of Patent: Jun. 26, 2007

(54) MAGNETIC BEARING USING DISPLACEMENT WINDING TECHNIQUES

(75) Inventors: David Carroll, Stafford, NH (US); John Salwen, Lee, NH (US)

(73) Assignee: Airex Corporation, Somersworth, NH (US)

( * ) Notice: Subject to any disclaimer, the term of this patent is extended or adjusted under 35 U.S.C. 154(b) by 0 days.

(21) Appl. No.: 11/125,917

(22) Filed: May 10, 2005

(65) Prior Publication Data

US 2005/0264119 A1 Dec. 1, 2005

Related U.S. Application Data

(60) Provisional application No. 60/569,960, filed on May 10, 2004.

(51) Int. Cl.
  *H02K 7/09* (2006.01)
  *H02K 17/00* (2006.01)
  *H02K 19/00* (2006.01)

(52) U.S. Cl. .................. 310/90.5; 310/207
(58) Field of Classification Search .............. 310/90.5, 310/184, 207
   See application file for complete search history.

(56) References Cited

U.S. PATENT DOCUMENTS

| | | | | |
|---|---|---|---|---|
| 2,961,747 | A * | 11/1960 | Lyman | 29/605 |
| 3,191,081 | A * | 6/1965 | Faulhaber | 310/154.04 |
| 3,316,032 | A * | 4/1967 | Wolf | 310/90.5 |
| 3,360,668 | A * | 12/1967 | Faulhaber | 310/195 |
| 4,331,896 | A * | 5/1982 | Sedgewick | 310/179 |
| 4,463,303 | A * | 7/1984 | Kirschbaum | 318/776 |
| 4,761,579 | A * | 8/1988 | Delassus | 310/90.5 |
| 4,890,049 | A * | 12/1989 | Auinger | 318/771 |
| 5,015,622 | A * | 5/1991 | Ward et al. | 505/166 |
| 5,079,458 | A * | 1/1992 | Schuster | 310/12 |
| 6,053,705 | A * | 4/2000 | Schob et al. | 417/53 |
| 6,072,251 | A * | 6/2000 | Markle | 310/12 |
| 6,472,790 | B2 * | 10/2002 | Rose, Sr. | 310/184 |
| 6,798,106 | B2 * | 9/2004 | Nakamura et al. | 310/179 |
| 6,969,930 | B2 * | 11/2005 | Lin et al. | 310/49 R |
| 2005/0073208 | A1 * | 4/2005 | Mitcham | 310/184 |

* cited by examiner

*Primary Examiner*—Burton S. Mullins
*Assistant Examiner*—Erik Preston
(74) *Attorney, Agent, or Firm*—Grossman Tucker Perreault & Pfleger, PLLC

(57) ABSTRACT

The present invention provides a linear, rotary spherical motor with an integrated magnetic bearing. The motor can be a toothless permanent magnet, BLDC design composed of a permanent magnet rotor and a Zigzag stator winding containing at least two-phase windings, where each phase is constructed of at least two circuits. Other exemplary embodiments include a trapezoidal winding configuration. The individual circuits of a phase are displaced away from each other along a line that is at right angles to the direction of the alternating polarity magnet array. The circuits forming a phase share the same "slot", and each circuit resembles a complete phase winding, however each circuit contains a proportion of the total number of turns of the phase. Controllable axial bearing force is developed through the differential balance of the currents in the circuits, while required motor torque is generated by the sum of the individual currents in a given phase. The relative motion in the rotor can produce back EMF which can provide positional information; A) in the direction parallel to the magnet array via the sum of the voltages in a phase; B) in the direction normal to the magnet array via the difference in circuit voltages.

10 Claims, 8 Drawing Sheets

Energizing 1 moves magnets up
" 2 moves " down

MAGNETIC BEARING USING DISPLACEMENT WINDING TECHNIQUES

This application claims the benefit of U.S Provisional Application Ser. No. 60/569,960 filed May 10, 2004, the teachings of which are hereby incorporated by reference in its entirety.

The U.S. Government has a paid-up license in this invention and the right in limited circumstances to require the patent owner to license others on reasonable terms as provided for by the terms of Contract Number 29601-01-C-0174 awarded by the Department of Defense.

FIELD OF THE INVENTION

The present invention relates to a magnetic bearing system and method using displaced winding techniques. More particularly, the present invention describes a linear, rotary or spherical permanent magnet Brushless Direct Current (BLDC) motor capable of producing controllable, simultaneous, rotational torque and directional force via a displaced winding arrangement.

BACKGROUND OF THE INVENTION

Tooth type and toothless Permanent Magnet (PM) motors produce torque between the stator and the PM rotor via the application of appropriate electric currents through two or more stator phase windings. Rotational torque is generated in the tooth type motor (where windings are tucked into slots, or behind tooth tips fashioned in the stator iron) through directed magnetic attraction and repulsion between the rotor magnets and the stator teeth.

Toothless or slotless motors (where the winding is in the flux gap) produce torque by bending the PM rotor flux field as current is applied to the stator windings. Tooth type motors typically exhibit high electrical inductance due to the smaller magnetic gap and the higher volume of iron (the coils are wrapped about iron teeth) in close proximity to the winding. Higher values of inductance decrease motor controllability due to restricted actuator response bandwidth. Tooth type motors and Electromagnetic (EM) bearings tend to be non-linear in torque and force production for high values of torque, and can completely fail to produce additional force or torque on peak demands due to flux saturation in the tooth type iron structures. Tooth-type motors, whether rotating or positioning exhibit far higher torque ripple or cogging than toothless motors due to the strong magnetic attraction or saliencies between stator teeth and rotor magnets.

Internal forces loading the motor shaft can be caused through differential magnetic pull created by deviations in rotor magnet-to-magnet strength as well as rotor centrality errors. These large forces increase exponentially as the rotor moves further off-center, positioning some of the rotor magnets closer to the stator iron. Tooth type motors with permanent magnet rotors exhibit a strong pull to a preferred axial position due to the sharp decrease in magnetic circuit reluctance as rotor magnets and back iron become axially aligned. Toothless motors have far less axial pull due to the inherently larger magnetic gap that accommodates the conductors positioned within the magnetic flux gap.

In toothless motors, axial forces are present between individual rotor magnets and adjacent current carrying coil end-turns, but the geometric balance over the entire motor results in the gross cancellation of most of these forces. Normally the rotor shaft must be supported in both the axial and radial directions by a bearing system, which allows the shaft to freely turn despite variations in the external shaft load, which includes the forces due to the working load, belt tension, reaction forces in gears and the internal rotor to stator forces described above. The typical motor shaft is supported via two (2) rolling element mechanical radial bearings, one on each end of the shaft, although other arrangements are sometimes used. A thrust bearing is typically integrated into the function of one or more of the mechanical radial bearings. The types of bearings often found in BLDC motors include: mechanical rolling element (ball or roller bearings), solid lubricated sleeves/thrust plates, fluid film (gas or liquid) types such as hydrostatic and hydrodynamic bearings.

Electromagnetic (EM) bearings are used, when cost is less of a factor, to maintain the shaft rotational centerline and thrust position without mechanical contact. Current EM motor bearing system designs include a BLDC motor combined with discrete Maxwell (tooth type) bearings and gap or position sensors. The typical resulting combination of EM Bearing and BLDC motor is physically large due to the lack of a common housing and magnetic circuit integration. In addition, the resulting system is significantly susceptible to loading by the forces described above, and suffers performance debits due to the high inductance. Due to the large magnetic gap and sufficiently thick radial band of back iron, toothless motors are quite immune to magnetic saturation, however; the removal of heat generated within the winding throughout such peak demands requires significant design consideration. Toothless motors have a hollow cylindrical volume for conductors traversing the length of the flux gap, allowing numerous choices for the placement and configuration of the conductors which form coils that form the stator.

The winding configurations used in existing toothless motors include the use of individual "single pole" pre-wound coils, pre-formed coils, or folded and inserted coils (sometimes called "skein" wound coils), that are subsequently positioned onto the stator assembly, and aligned with virtual slots. Complete motor structures can be wound in numerous configurations on a fixture where conductors are forced into virtual slots by tooling thus producing the same effect as individual wound coils described above. These configurations are all planar about a cylinder in the sense that the coils are distributed equally about a centerline, and that the mid-point of the coils are centered on a plane normal to and located on the centerline. FIG. 1 illustrates the placement of a single phase into virtual slots as a wave winding.

FIG. 1 depicts a BLDC Motor Typical Conductor Configuration (one phase of a wave winding is shown) with centerline and mid-plane. The back iron is not shown in FIG. 1, but can be placed on the outside of the coil for an inside rotor motor, or placed inside the coil when constructing an outside rotor motor. The rotor construction incorporates iron; often called "Return Iron" backing the permanent magnets. FIG. 2 depicts a line drawing of a self-standing cylindrical zigzag 3-phase motor winding and illustrates a self-supporting 3-phase Zigzag winding configured for use in a radial gap motor. The application of this winding to inside or outside rotor motors and the construction of suitable permanent magnet rotors and back iron are details familiar to those skilled in the art.

An axial gap motor (not shown), places the PM rotor between two back-iron or return path plates with pie shaped coils positioned in the flux gap on one or both sides of the rotor, and has motoring attributes similar to those described above.

SUMMARY OF THE INVENTION

In one aspect, the present invention provides a toothless permanent magnet motor, composed of a permanent magnet rotor and a Zigzag stator winding containing at least two-phase windings, where each phase is constructed of at least two circuits. Other exemplary embodiments include a trapezoidal winding configuration. The individual circuits of a phase are displaced away from each other along a line that is at right angles to the direction of the alternating polarity magnet array. The two circuits share the same "slot", and each circuit resembles a complete phase winding, however, each contains half the total number of turns of the phase. Controllable axial bearing force is developed through the differential balance of the currents in the circuits, while required motor torque is generated by the sum of the individual currents in a given phase. The relative motion in the rotor can produce Back EMF which can provide positional information; A) in the direction parallel to the magnet array via the sum of the voltages in a phase; B) in the direction normal to the magnet array via the difference in circuit voltages.

This invention can be configured as: 1) A radial gap device to produce rotational torque and axial (thrust) direction forces, 2) As an axial gap device, to produce controllable simultaneous rotational torque and radial forces, or 3) as a linear device producing multiple simultaneous, controllable force vectors. The combination of electromagnetic forces enable this device to provide the desired force or torque to the load while supporting or positioning the load in a second axis, a task normally delegated to a second actuator or a mechanical bearing system. These highly integrated rotary BLDC motors and electromagnetic bearing/positioning devices are connotated as "Self Bearing Motors" (SBM).

Further, multiple configurations of this invention can be configured and integrated to produce a linear SBM, providing contact-less 6 degree of freedom support, with linear force production in at least two directions. This unique winding approach can be directly integrated with Airex's previous work in combination electromagnetic motor-bearings (where motor torque and radial force is produced in a segmented electromagnetic device), resulting in an Advanced Integrated SBM capable of simultaneously producing motoring torque, radial forces and thrust forces. Those skilled in the art could identify other configurations for these toothless electromagnetic devices including spherical geometries, where for instance, a sphere could "float" about a center and simultaneously rotate in any direction. A linear motor places the coil in the flux field between two plates populated with permanent magnets. The zigzag coils provide motoring axis parallel to the magnetic row while differential currents provide a thrust force perpendicular to the magnetic row.

This invention, when coupled with the appropriate sensing electronics, can allow the real-time measurement of angular, radial, and axial position of the moving member, thus eliminating numerous discrete sensors (and associated electronics) that are required in closed loop control applications.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

The following invention utilizes the toothless motor coils to simultaneously generate dynamically controllable forces on the rotating member (the rotor shaft system). The resulting motor-bearing system is capable, with the support of advanced control capabilities, of high performance attributes such as fine shaft centering, auto balancing, and vibration isolation.

This invention describes a set of exemplary winding arrangements, which when applied to a toothless motor or any motor where the current carrying conductors are in the flux gap, allows the simultaneous production of motoring torque (or force for a linear configuration), and controllable forces directed along selected vectors (such as in the thrust or radial direction). The fundamental element of this invention is the concept of two or more independent circuits (windings) each representing a motor phase, where the actions of the differential currents in these circuits determine the magnitude and direction of resulting torques and forces.

The following detailed description describes two exemplary winding geometries: the "Displaced Zig-Zag", and the Displaced Trapezoid winding. Those skilled in the art will recognize that these represent only examples of the principles of the present invention, and other winding geometries are equally contemplated by the teachings set for the herein.

The displaced Zig-Zag introduces the linear displacement arrangement and the Displaced Trapezoid introduces the angular displacement arrangement. The displaced "Zig-Zag" winding will be discussed first.

I. Displaced Zigzag Winding

Figure 1:
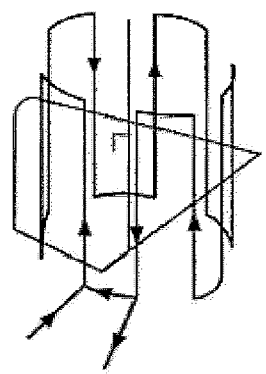
FIG. 1 is a conventional BLDC motor conductor configuration.
Figure 2:
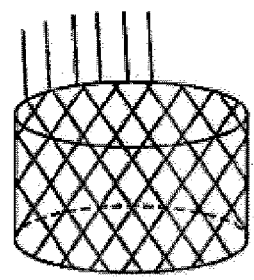
FIG. 2 is a line drawing of a conventional self-standing cylindrical zigzag 3-phase motor winding.
Figure 3:
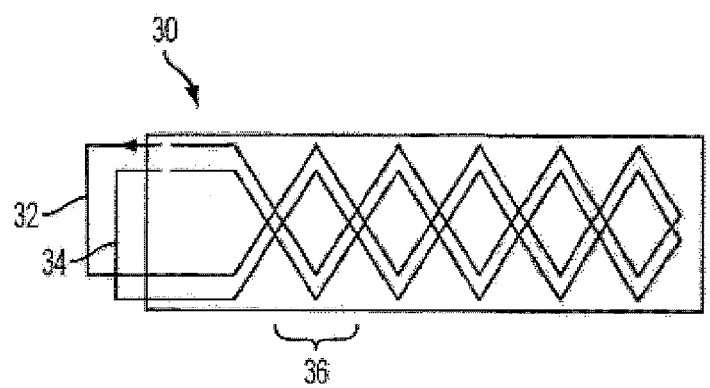
FIG. 3 depicts one phase of a linear "Displaced Zig-Zag" winding divided into 2 circuits according to the present invention.

FIG. 3 depicts one phase of a linear "Displaced Zig-Zag" winding 30 divided into 2 circuits according to the present invention. Each phase is composed of circuits displaced in the vertical direction, as shown in FIG. 3. Each line in the figure represents a number of individual conductors making up the winding of a particular circuit. In a toothless motor constructed in this way, the conductors may be distributed over the slot space (horizontal direction in FIG. 3) to form a continuous sequence of individual conductors (and may further be constructed with the smallest number of overlapping conductors, producing a structure that is as thin as possible in the magnetic gap direction (the direction normal to the diagram)).

The winding is used with a permanent magnet rotor with alternating polarity poles, where the pole pitch of the rotor matches the pitch of the winding. The rotor magnet height is typically one half to two thirds the peak-to-peak height of the windings. The rotor may be composed such that magnets are placed on both sides of the winding (called an ironless design) where facing magnets maintain the flux direction across the gap, and adjacent magnets have opposite polarity, similar to the construction of the Airex Corporation brushless DC motor, part No. P12.

Another configuration is where backiron is positioned behind the winding (across a clearance gap) and additional backiron is positioned behind the magnets (the iron on both sides is of similar height to the magnets).

A third configuration is where a stationary back iron is in place and is attached to the winding in a configuration where the magnet and return iron move relative to the coil and back iron. An axial reluctance centering effect is present, which can be quite strong when the magnet pole is nearly the same height as the back iron. The reluctance centering effect can be reduced by increasing the height of the back iron to at least the height of the peaks of the winding, while maintaining the magnet pole at about two thirds the height of the winding.

The displaced "Zig-Zag" winding may include at least two circuits per phase 32 and 34, where the reference or base force/torque is produced by the average current in all of the circuits in the motor, and the off axis centering force is produced proportional to the difference in current amplitude in each of the circuits. Linear winding diagrams will be used to simplify the presentation of the motor windings to follow. As such, radial motor torque or linear motor force is generated in the horizontal direction in the diagrams, and axial force is shown in the vertical direction in the diagram. In general, energizing Circuit 1 (32) moves associated magnets up, while energizing Circuit 2 (34) moves associated magnets down.

Figure 4:
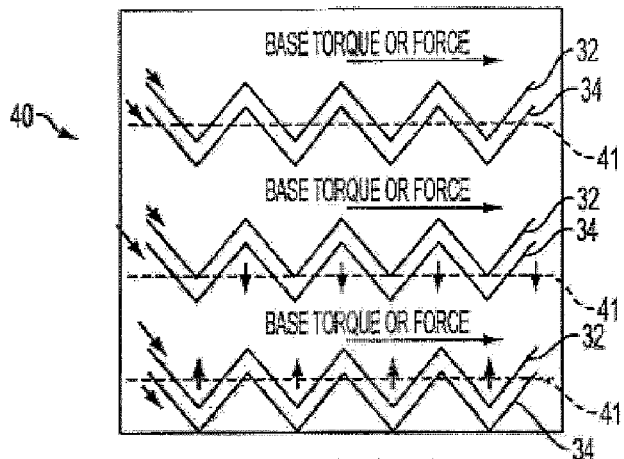
FIG. 4 depicts the combination of current in the displaced zig-zag winding and the resultant torque and centering forces according to the present invention.
Figure 5:
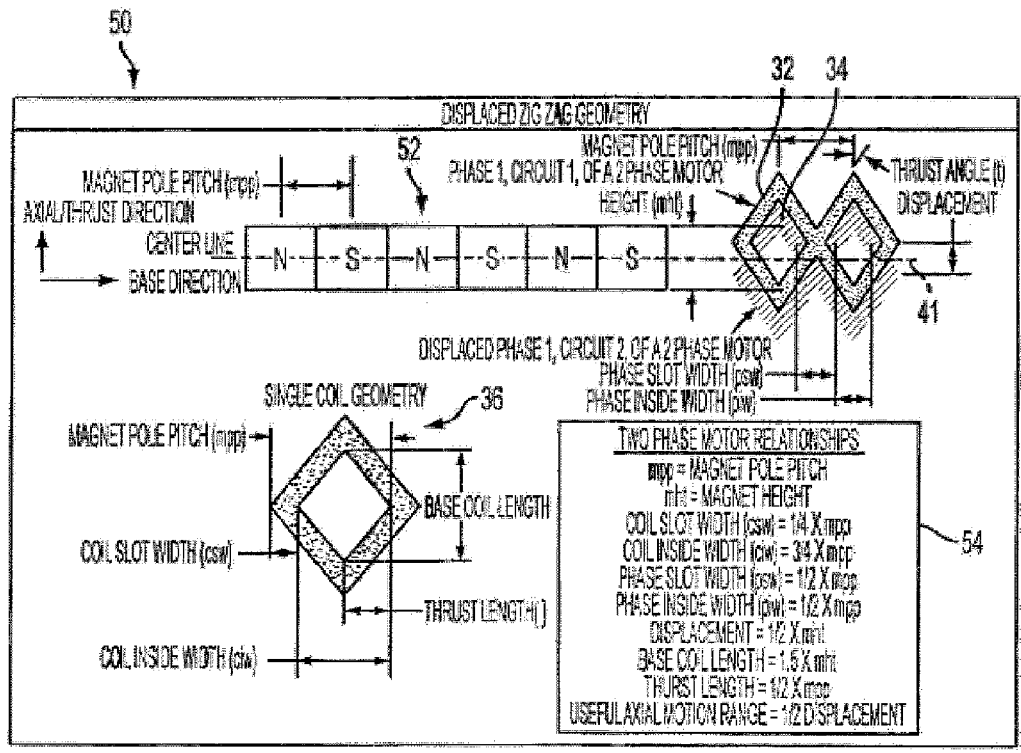
FIG. 5 depicts the details of the displaced zig-zag geometry of the present invention.

FIG. 4 illustrates three views of force production for different current combinations in a partial phase of a zigzag winding 30 with 2 circuits (32 and 34), where the horizontal force or torque is maintained in each view. The length of angled arrows in FIG. 5 represent the differential current magnitude in each circuit, and the verticle arrows represent the resulting off axis force. The axis in this example is depicted as the horizontal line through the windings. The displaced circuit with the higher current will produce a force that tends to center that circuit over a corresponding magnet magnet.

As shown in FIG. 5, the force generated between the winding 36 and the rotor magnets 52 along the horizontal direction is given by:

$$F = B \times L \times (I_1 + I_2) \times N \times P \times \cos(\theta) \quad (1)$$

Where:
F is the centering force (Newtons)
B is the average magnet pole flux density (Tesla)
L is the length of one side of the (zig) exposed to magnetic flux (Meters)
$I_x$ is the current in a given phase circuit (Amps)
N is the number of conductors in a given slot for a circuit of a given phase
P is the number of magnet poles
$\theta$ is the angle of the "zig" from vertical The amplitude of the force in the axial direction depends on numerous conditions and is a function of the angle of the winding, the relative amount of displacement between circuits, and geometric constraints of back-iron, return iron and magnets relative to the peak to peak size of the winding.

The average magnitude of the back EMF generated by the displaced winding circuit in a given motor phase is directly proportional to the rotational speed of the device, and the back EMF differential amplitude between circuits of a given phase is directly proportional to the axial position of the device. Actual test data showing the amplitude change with rotor position is shown in FIGS. 11 and 12.

Figure 11:
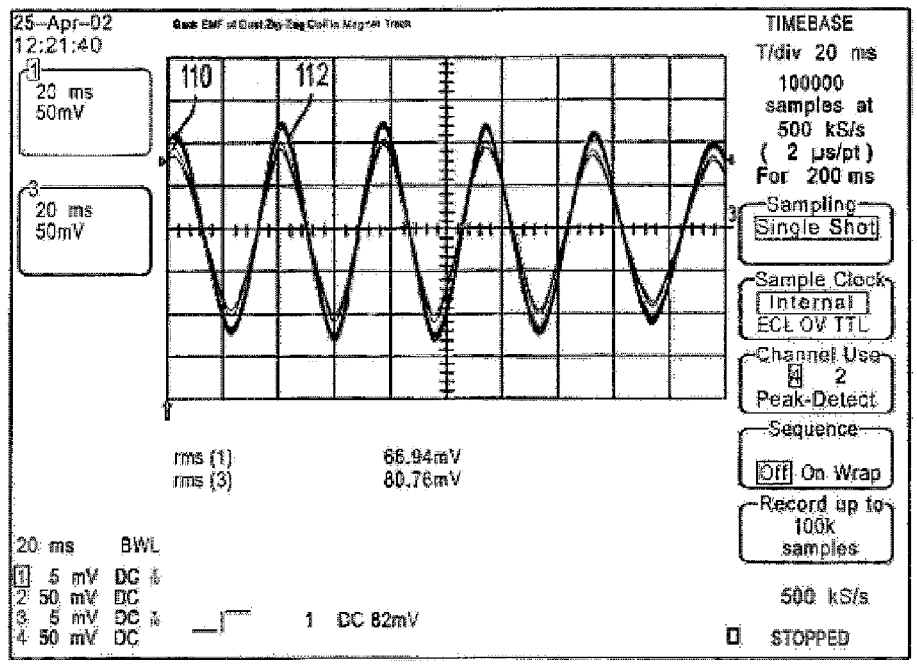
FIG. 11 depicts an oscilloscope screen capture of test data related to back EMF of the zig-zag winding arrangement.
Figure 12:
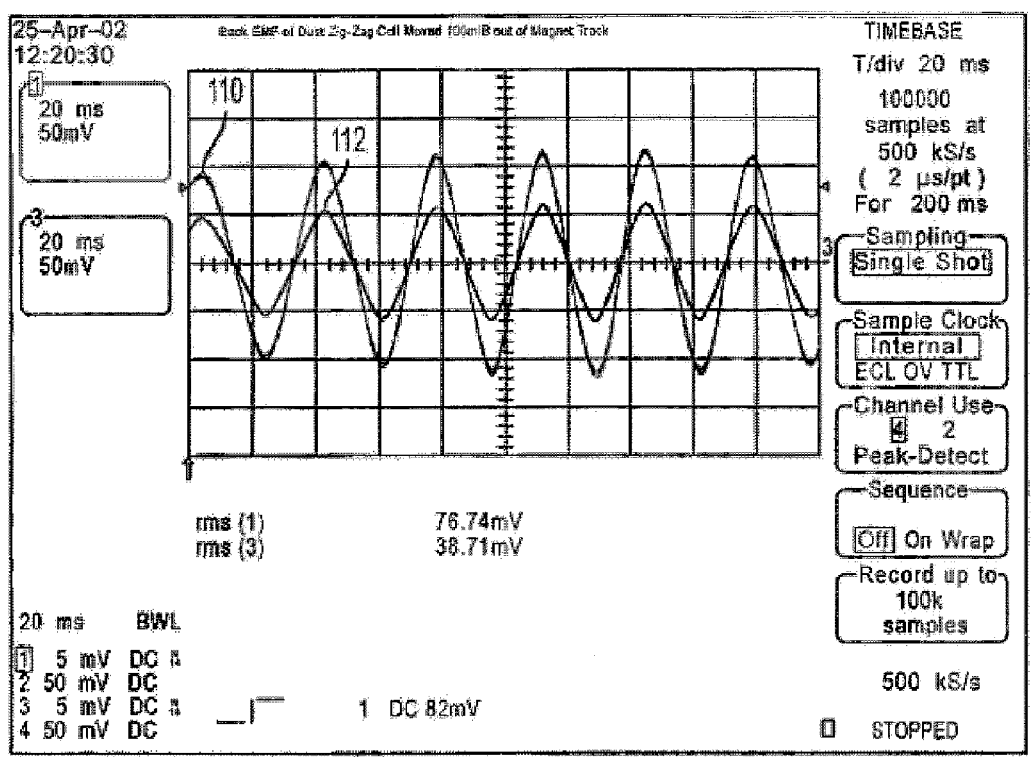
FIG. 12 depicts an oscilloscope screen capture of test data related to back EMF of the zig-zag winding arrangement.

FIG. 11 shows the Back EMF signatures of the two offset coils in a near balance condition. In this test, the windings are equally distributed over the magnet pole, both BEMF signatures have same phase and nearly equal magnitude. FIG. 12 shows the Back EMF signatures of the two distributed circuits of one phase when displaced 0.3" in the thrust direction. The differential change in magnitude is a measurement of the physical thrust displacement away from the center of the magnet pole.

II. Displaced Trapezoid Winding

Figure 6:
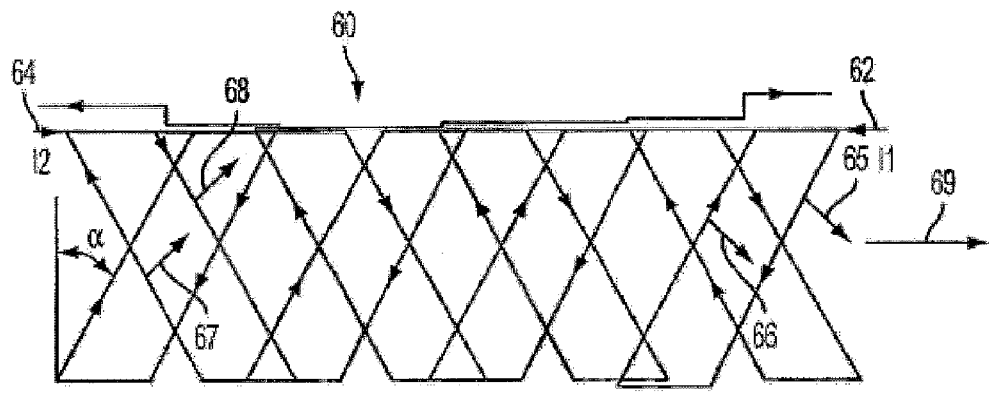
FIG. 6 depicts a displaced trapezoidal winding configuration of the present invention.

FIG. 6 depicts a displaced trapezoidal winding configuration 60 of the present invention. The Displaced Trapezoidal winding can be constructed from discrete coils or generated as a continuous wave winding. The rotor magnet requirements for this winding are similar to that described above for the Zigzag winding. Each motor phase is broken down into at least two circuits (11 and 12) where the trapezoid shape of one circuit coil is the mirror image or reverse of the coils in the adjacent circuit. As current is passed through the circuits while the winding is in the presence of an alternating magnetic field of the appropriate pitch, a force vector is generated in the plane of the winding at right angles to current flow in each conductor. Due to the geometric mirroring of the coil shapes, the sum of the forces produced in the two circuits will be a force vector along the surface of the winding plane. By controlling the phase difference between the currents in the circuits making up the phase, the force vector can be controlled. Thus in a radial gap motor, the force can be in either axial direction or in the torque direction as shown in FIG. 6. The controllable forces produced by this winding can be mathematically represented as described in the following section:

The force in the normal torque or "Base" direction is:

$$F_B = B \times L \times (I_1 + I_2) \times N \times P \times \cos(\theta) \quad (2)$$

and the force in the transverse or axial direction is:

$$F_s = B \times L \times (I_1 - I_2) \times N \times P \times \sin(\theta) \quad (3)$$

Where:

$F_B$ is the torque direction or "base" force
$F_s$ is the direction of "transverse or axial" force
B is the average magnet pole flux density
L is the length of one side of the trapezoid exposed to magnetic flux (overlap of magnet height)
$I_x$ is the current in a given phase circuit. The current in each circuit is typically in the form of
$A \times \sin(2\pi f + \phi)$; where A is amplitude, f is the driving frequency, and $\phi$ is the angular difference between motor phase currents.
N is the number of conductors in a given slot for a circuit of a given phase
P is the number of magnet poles
$\theta$ is the angle of the trapezoid side from vertical
Fb (Direction along magnet array)
Fs (Direction normal to magnet array)

In the trapezoidal winding 60, the phase-angle between the currents in each circuit produces the principle off-axis force. The differential back EMF produced by the circuits in each phase of this winding is nearly constant in amplitude, but varies in phase with a position change in the direction of the off axis force as shown in FIG. 14. Actual measured Back EMF showing phase change corresponding to device position can be seen by comparing FIGS. 13 and 14.

Figure 13:
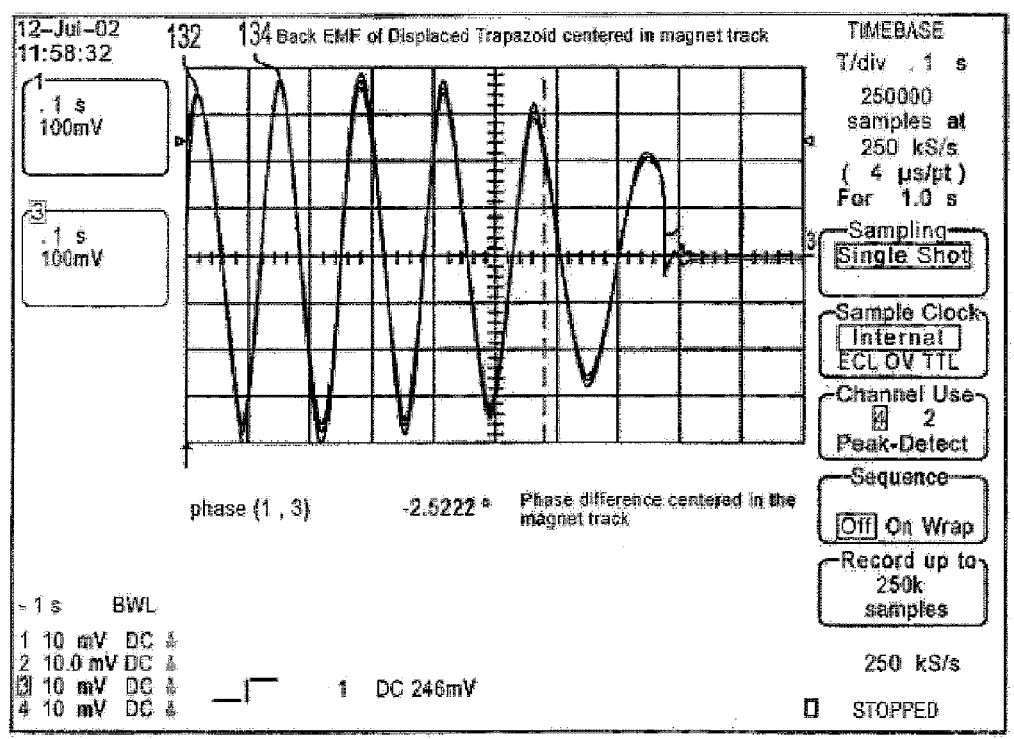
FIG. 13 depicts an oscilloscope screen capture of test data related to back EMF of the trapezoidal winding arrangement.
Figure 14:
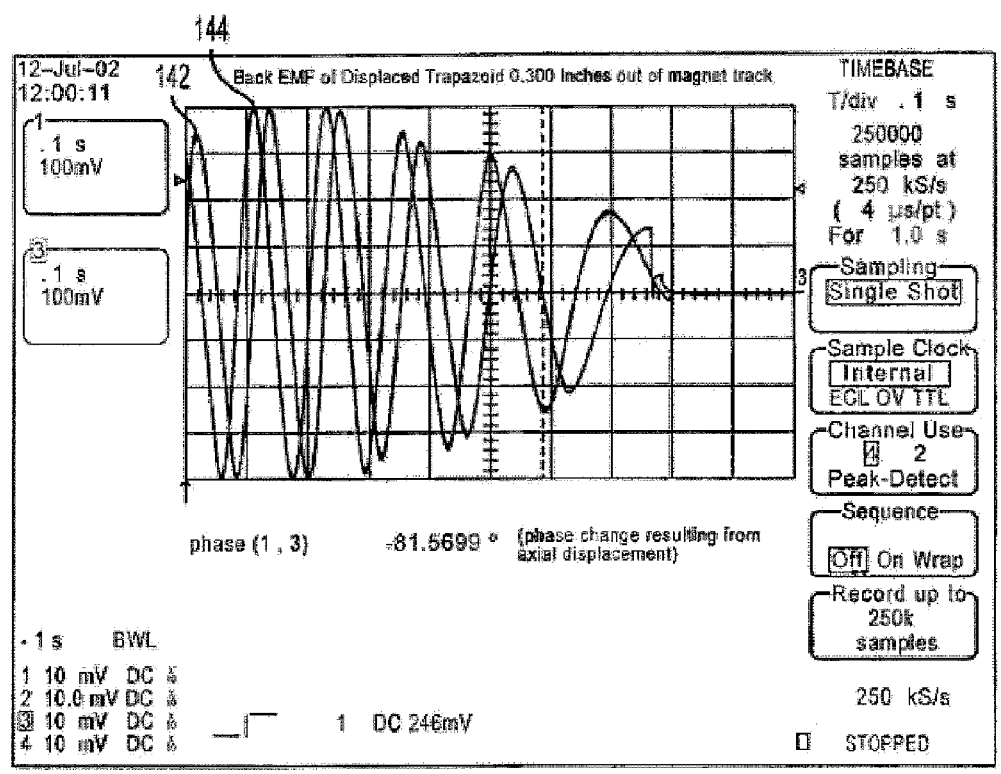
FIG. 14 depicts an oscilloscope screen capture of test data related to back EMF of the trapezoidal winding arrangement.

FIG. 13 shows the Back EMF signatures of the two Trapezoidal coils, comprising one phase, in a near balance condition (The magnet pole is axially centered on both coils, both BEMF signatures have same phase). In FIG. 13 one phase of a Displaced Trapazoid winding with no axial offset (centered). Moving the magnet pole in the thrust direction by 0.300" produced the signatures shown in FIG. 14. FIG. 14 shows the Back EMF signatures of the two Trapezoidal coils, comprising one phase, when displaced 0.3" in the thrust direction. The differential change in phase is a measurement of the physical thrust displacement away from the center of the magnet pole.

Figure 7:
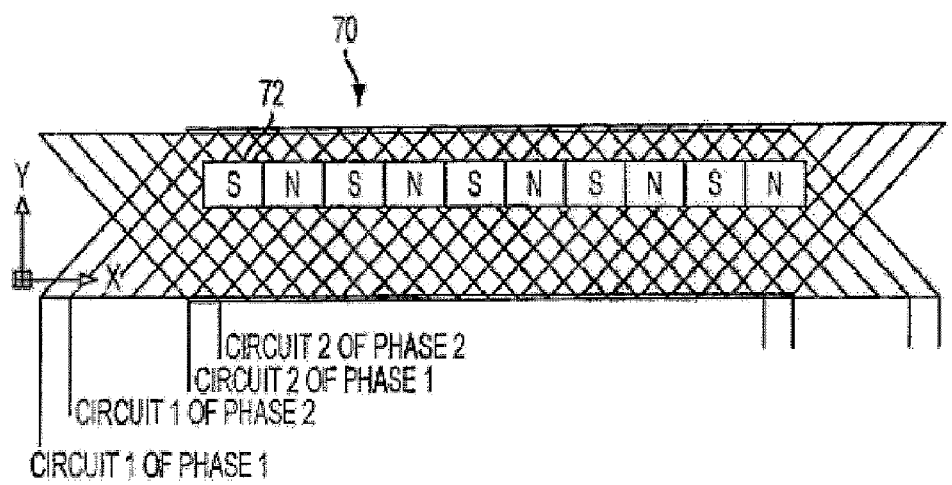
FIG. 7 depicts a planar grid representation of the trapezoidal winding configuration of the present invention.

Since the individual trapezoid shapes can cross and replicate additional poles in the axial direction, long motion strokes of the rotor magnet can be achieved in both the X and Y directions if configured as a planar grid as shown in FIG. 7. The magnet array shown in FIG. 7 can be extended as an XY grid of magnets to increase force.

Figure 8:
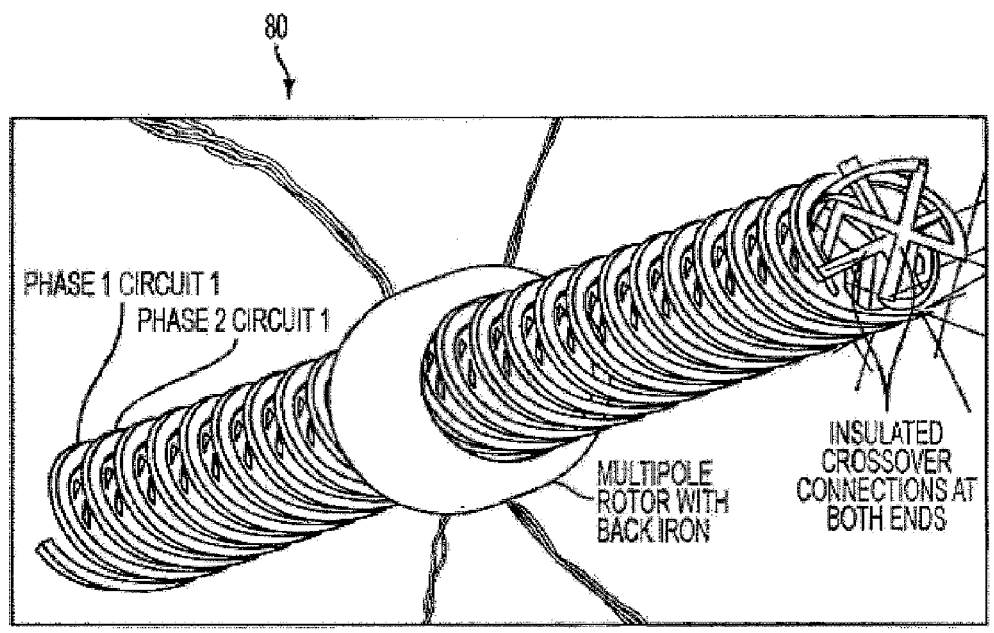
FIG. 8 depicts a three dimensional rotary motor utilizing the trapezoidal winding configuration of the present invention.
Figure 9:
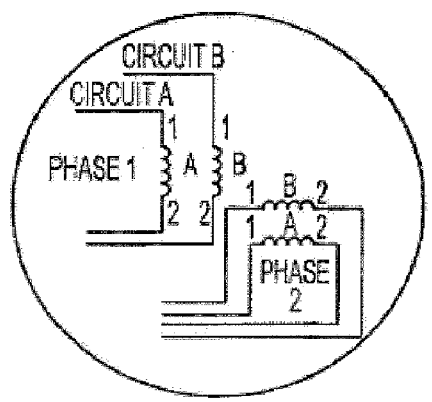
FIG. 9 depicts a circuit topology for driving the displaced windings of the present invention.
Figure 10:
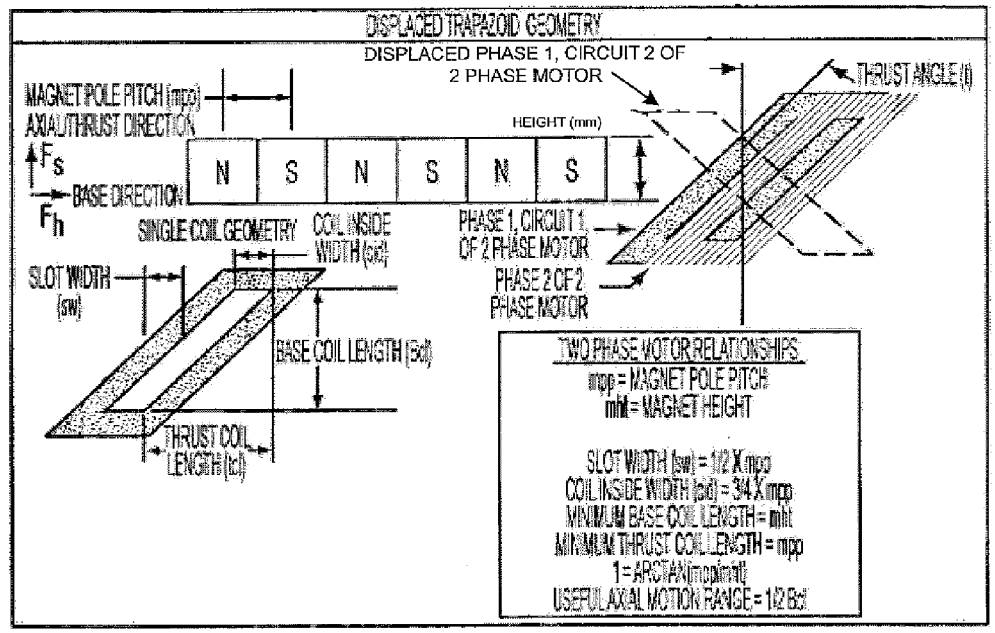
FIG. 10 depicts the details of the displaced trapezoidal winding configuration of the present invention.

FIG. 8 depicts a "MAY POLE" version 80 of the Extended Trapezoid Cylindrical winding. Those skilled in the art will recognize that the large array of coils shown in FIG. 8 can be divided into suitable groups, allowing electronic switching to be used to power only the needed coil sections thus minimizing the heating and power required. The winding shown in FIG. 8 can be enhanced through additional circuits on one side or quadrant of the array to provide the rotor with a tilt axis of motion in addition to the above described X and Y motions. If this winding composed of circuits is wrapped on a cylinder as a helix, the "May Pole" actuator results, which can produce simultaneous rotation and translation shown in Figure. The "MAY POLE" version of this extended trapezoidal design is constructed by wrapping all phase circuit 1's in alternating bands in one layer, and then all circuit 2's again alternating in the second layer. Through proper connection to appropriate currents, the diamond shaped magnetic pole is produced, which can produce force vectors along the plane of the winding, and through the use of additional circuits can provide force elements for bearing support.

Alternative Embodiments:

Both the Zig-Zag and trapezoidal displacement winding configurations can be deployed with multiple circuits (more than 2) per phase, offset to produce the force along different vectors. For example a displaced winding radial gap motor with three circuits can produce a thrust vector with tilt (points off the Z axis). An axial gap motor with the centers of the winding circuits displaced in the radial direction can produce torque and simultaneous radial forces in the X and Y directions. Both displaced windings can be arranged on the surface of a sphere either as tiles, or as bands. Multiple configurations of displaced windings including bands, segments, or patches, can be arranged along the surface of a sphere to provide torque, full levitation, and tilt. With sufficient relative velocity between stator and rotor, these spherical windings produce a Back EMF proportional to velocity and relative to position.

Radial gap devices may be formed with at least 2 phases where each phase has three or more circuits each circuit having a peak displacement at different but equally spaced points around the device where the amount of displacement smoothly changes in each circuit relative to the rotational position around the device to provide tilt in the XY plane with simultaneous rotation.

An axial gap device with three or more circuits, each circuit displaced from center, where the point of peak displacement for all circuits in a phase are equally distributed along the device perimeter, allowing full radial position control while providing rotational torque. A combination of the above two devices provides full 6 degrees of freedom control The displaced winding motors and motor bearings described by this invention can produce electronically controlled torque in the direction of rotation as well as axial forces. When combined with segmented motor bearing geometries this invention provides full integration of motor and bearing functionality into a single device. This advanced integrated motor bearing functionality is achieved by placing a pair of displaced winding circuits in each phase of each motor bearing segment. For complete six degree of freedom control, such a motor must contain 2 or more phases per segment, and 3 or more segments. This device may be configured as a radial gap motor or as an axial gap motor. Those skilled in the art will recognize that "unwrapping" the rotary motor bearing configuration will allow the full bearing functionality to be applied to the resulting linear system.

Those skilled in the art will recognize application for this technology to devices and applications such as: Fractional pitch BLDC motor, Dynamic braking, Gearbox synchronism mechanisms. Some features of the present invention may include small package size EM motor bearing, radial centering or preload when used with a hydrodynamic air bearing, axial levitation (thrust direction) of a system containing a radial hydrodynamic air bearing, active preload for a dual bearing cartridge, contoured pre-load of a mechanical bearing over an established speed profile, self-sensing position control in one or more axis, virtually zero drag replacing mechanical elements as a system component, and low/no out gassing structure facilitates vacuum/space applications.

Those skilled in the art will recognize that the novel concepts described herein can be achieved with a variety of coil winding approaches including but not limited to distributed wound coils, wave winding, concentric wound coils, as well as flat wound and inserted coils. Those skilled in the art will further recognize numerous modifications to, and numerous applications of the present invention. All of which are deemed within the spirit and scope of the present invention only as limited by the claims.

The invention claimed is:

1. A linear, rotary or spherical motor bearing system comprising: a stator winding comprising a plurality of phases, each said phase comprising a plurality of circuits, wherein each circuit provides a complete phase winding, and wherein each circuit is displaced from one another, and wherein each phase is capable of imparting a first force on a rotor in a first direction based on a differential current in said plurality of circuits of said phase and capable of imparting a second force on said rotor in a second direction based on a sum of said current through said plurality of circuits of said phase.

2. A motor bearing system as claimed in claim 1, wherein said circuits are displaced from one another in a direction other than the principal flux rotation vector direction.

3. A motor bearing system as claimed in claim 1, wherein the winding geometry of each circuit comprises a displaced Zig-Zag geometry.

4. A motor bearing system as claimed in claim 1, wherein the winding geometry of each circuit comprises a mirrored trapezoid geometry.

5. A motor bearing system as claimed in claim 1, wherein the phase or amplitude differences between the currents in each said circuit creates controllable and directed forces along the plane of the stator winding.

6. A linear, rotary or spherical motor with an integral electromagnetic bearing comprising a rotor assembly comprising a plurality of permanent magnets and a stator assembly, said stator assembly includes windings comprising two or more phases, each phase comprising of two or more circuits, wherein each circuit provides a complete phase winding, and wherein each said circuit is displaced with respect to one another, and wherein each phase is capable of imparting a first force on said rotor in a first direction based on a differential current in said plurality of circuits of said phase and capable of imparting a second force on said rotor in a second direction based on a sum of said current through said plurality of circuits of said phase.

7. A motor as claimed in claim 6, wherein said circuits are displaced from one another in a direction other than the principal flux rotation vector direction.

8. A motor as claimed in claim 6, wherein the winding geometry of each circuit comprises a displaced Zig-Zag geometry.

9. A motor as claimed in claim 6, wherein the winding geometry of each circuit comprises a mirrored trapezoid geometry.

10. A motor as claimed in claim 6, wherein the phase or amplitude differences between the currents in each said circuit creates controllable and directed forces along the plane of the stator winding.

* * * * *